United States Patent
Mori et al.

(10) Patent No.: US 9,771,099 B2
(45) Date of Patent: Sep. 26, 2017

(54) MOTOR CONTROL DEVICE AND ELECTRIC POWER-STEERING DEVICE AND VEHICLE USING SAID MOTOR CONTROL DEVICE

(71) Applicant: NSK Ltd., Shinagawa-ku, Tokyo (JP)

(72) Inventors: Kenji Mori, Fujisawa (JP); Takeshi Senba, Maebashi (JP); Shigeo Shinohara, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 15/115,001

(22) PCT Filed: Feb. 26, 2015

(86) PCT No.: PCT/JP2015/000972
§ 371 (c)(1),
(2) Date: Jul. 28, 2016

(87) PCT Pub. No.: WO2015/129271
PCT Pub. Date: Sep. 3, 2015

(65) Prior Publication Data
US 2016/0339949 A1 Nov. 24, 2016

(30) Foreign Application Priority Data
Feb. 28, 2014 (JP) ................. 2014-038424

(51) Int. Cl.
*H02H 5/00* (2006.01)
*B62D 5/04* (2006.01)
(Continued)

(52) U.S. Cl.
CPC ......... *B62D 5/0484* (2013.01); *B62D 5/0487* (2013.01); *H02P 29/028* (2013.01); *H02P 29/032* (2016.02)

(58) Field of Classification Search
CPC .... H02P 6/12; H02P 6/00; H02P 27/04; H02P 27/06; H02P 23/00; H02P 25/00;
(Continued)

(56) References Cited

U.S. PATENT DOCUMENTS

| 5,414,339 A | 5/1995 | Masaki et al. |
| 8,545,381 B2 * | 10/2013 | Kanebako ........... A61M 1/1086 600/16 |

(Continued)

FOREIGN PATENT DOCUMENTS

| EP | 0 588 628 A1 | 3/1994 |
| JP | 2008-132919 A | 6/2008 |

(Continued)

OTHER PUBLICATIONS

International Preliminary Report on Patentability (PCT/IB/338 & PCT/IB/373) issued in PCT Application No. PCT/JP2015/000972 dated Sep. 15, 2016, including English translation of document C2 (Japanese-language Written Opinion (PCT/ISA/237) previously filed on Jul. 28, 2016 (eight (8) pages).

International Search Report (PCT/ISA/210) issued in PCT Application No. PCT/JP2015/000972 dated May 19, 2015 with English-language translation (three (3) pages).

(Continued)

*Primary Examiner* — Antony M Paul
(74) *Attorney, Agent, or Firm* — Crowell & Moring LLP

(57) ABSTRACT

A motor controller includes: a main motor drive circuit configured to control driving of a multi-phase electric motor; a backup motor drive circuit configured to control driving of the multi-phase electric motor, when an abnormality occurs at the main motor drive circuit; and an abnormality diagnosis unit configured to diagnose the abnormality of the main and backup motor drive circuits. In a normal drive state, only the main motor drive circuit is configured to drive the multi-phase electric motor, and in a backup drive state, when the abnormality diagnosis unit diagnoses that the abnormality occurs at the main motor drive circuit as a diagnoses (Continued)

result, a motor current of a phase output unit where the abnormality occurs is cut off, and the phase output unit that has been cut off is replaced with another phase output unit of a same phase in the backup motor drive circuit.

6 Claims, 8 Drawing Sheets

(51) Int. Cl.
  *H02P 29/032* (2016.01)
  *H02P 29/028* (2016.01)

(58) Field of Classification Search
  CPC . H02P 25/22; H02K 3/28; H02H 5/00; H02H 7/00
  USPC .... 318/400.01, 400.02, 400.14, 400.15, 599, 318/700, 701, 727, 799, 800, 801, 430, 318/432, 437; 363/40, 44, 95, 120, 174, 363/175; 361/23, 47, 61, 63, 65, 88; 700/143; 369/53.42
  See application file for complete search history.

(56) References Cited

U.S. PATENT DOCUMENTS

| | | |
|---|---|---|
| 2011/0015732 A1 | 1/2011 | Kanebako |
| 2011/0074323 A1 | 3/2011 | Mukai |
| 2013/0285584 A1 | 10/2013 | Kim et al. |
| 2013/0345804 A1 | 12/2013 | Kanebako |

FOREIGN PATENT DOCUMENTS

| | | | |
|---|---|---|---|
| JP | 2008132919 A * | 6/2008 | .............. H02P 27/08 |
| JP | 2009-67174 A | 4/2009 | |
| JP | 4998836 B2 | 8/2012 | |
| WO | WO 2009/119462 A1 | 10/2009 | |

OTHER PUBLICATIONS

Japanese-language Written Opinion (PCT/ISA/237) issued in PCT Application No. PCT/JP2015/000972 dated May 19, 2015 (four (4) pages).
Extended European Search Report issued in counterpart European Application No. 15754550.0 dated Apr. 6, 2017 (Seven (7) pages).

* cited by examiner

MOTOR CONTROL DEVICE AND ELECTRIC POWER-STEERING DEVICE AND VEHICLE USING SAID MOTOR CONTROL DEVICE

TECHNICAL FIELD

The present invention relates to a motor controller configured to control driving of a multi-phase electric motor, an electric power steering device using the same, and a vehicle.

BACKGROUND ART

In a motor controller that controls driving of an electric motor of an electric power steering device mounted in a vehicle, an electric motor of a dynamo-electric brake device, and an electric motor for traveling of an electric vehicle or a hybrid vehicle, even if an abnormality occurs in a motor control system, continuous driving of the electric motor is demanded.

To meet the above demand, the motor windings of the multi-phase electric motor are configured in a duplex system, for example, electric currents are supplied from individual inverter units to the motor windings in the duplex system. If an off failure in which a switching unit in one of the inverter units is not conductive, that is an open failure occurs, a failure control unit identifies such a failed switching unit, controls other switching units except for the failed switching unit, and controls normal inverter units except for the failed inverter unit including the failed switching unit. A controller of a multi-phase rotary machine including the above-described failure control unit and an electric power steering device using the controller is proposed (for example, see Patent Literature 1).

CITATION LIST

Patent Literature

PTL 1: JP 4998836 B

SUMMARY OF INVENTION

Technical Problem

In the conventional example of Patent Literature 1 as described above, however, when the off failure occurs at the switching unit in one of the inverter units in the duplex system, driving of the multi-phase rotary machine is continuously controlled while suppressing a degradation of the torque, by controlling the switching units except for the failed switching unit that is suffering from the off failure, and correcting a q-axis current instruction value in the normal inverter for a degraded amount of the torque caused by controlling the failed inverter unit including the failed switching unit.

In the above-described conventional example, however, when an off failure occurs at the switching unit of the inverter unit, enough torque can be generated, but when an on failure (short-circuit failure) occurs at the switching unit of the inverter unit, the motor becomes the power generator and generates electromagnetic braking. Even if the switching unit that is abnormal is excluded and an instruction value of the normal switching unit is corrected for driving the motor, the braking torque reduces the output torque. Then, the steering assist to the driver's steering degrades, and may give a strange steering feel to the driver. Besides, there is an unsolved drawback that since a large current has to be supplied to the inverter or the motor to cancel the braking torque, the motor and the inverter are over heated and the assist duration in the short-circuit failure is shorter.

In the above conventional example, it is necessary to provide a configuration in which the motor winding terminals in duplex system come out from the motor. Hence, there is another drawback in that the complicated interconnection in the motor and the increased number of component parts necessary for the interconnection process lead to an increase in size, and similarly in the ECU included in the motor drive device for driving the motor, the complicated motor interface unit and the increased number of component parts lead to the increase in size.

Thus, the present invention has been made in view of the above circumstances of the conventional examples, and has an object to provide a motor controller capable of continuously controlling driving of an electric motor in a simple configuration without generating the electromagnetic braking, even when a short-circuit failure occurs at a motor drive circuit with an ordinary motor, an electric power steering device using the motor controller, and a vehicle.

Solution to Problem

In order to achieve the above object, there is provided a motor controller according to one aspect of the present invention. The motor controller includes a main motor drive circuit configured to control driving of a multi-phase electric motor; a backup motor drive circuit connected to the multi-phase electric motor in parallel to the main motor drive circuit, and configured to control driving of the multi-phase electric motor, when an abnormality occurs at the main motor drive circuit; and an abnormality diagnosis unit configured to diagnose the abnormality of the main motor drive circuit and the backup motor drive circuit; wherein in a normal drive state, only the main motor drive circuit is configured to drive the multi-phase electric motor, and in a backup drive state, when the abnormality diagnosis unit diagnoses that the abnormality occurs at the main motor drive circuit as a diagnoses result, a motor current of a phase output unit where the abnormality occurs is cut off and the phase output unit that has been cut off is replaced with another phase output unit of a same phase in the backup motor drive circuit to drive the multi-phase electric motor.

In addition, according to one aspect of the present invention, there is provided an electric power steering device including the above-described motor controller including an electric motor configured to generate a steering assistance force at a steering mechanism.

Further, according to one aspect of the present invention, there is provided a vehicle including the above-described motor controller.

Advantageous Effects of Invention

According to the present invention, in a normal drive state, only the main motor drive circuit is configured to drive the multi-phase electric motor, and in a backup drive state, when the abnormality diagnosis unit diagnoses that the abnormality occurs at the main motor drive circuit as a diagnoses result in the normal drive state, a motor current of a phase output unit where the abnormality occurs is cut off, and the phase output unit that has been cut off is switched to another phase output unit of a same phase in the backup motor drive circuit to drive the multi-phase electric motor. Therefore, the motor current is cut off at the phase output unit where the abnormality occurs. This configuration certainly prevents the multi-phase electric motor from operating as a power generator that generates the electromagnetic braking. Even when an open failure or an short-circuit failure occurs at a hardware made of a motor drive circuit and the like, for example, the multi-phase electric motor can be driven continuously.

The electric power steering device includes the motor controller with the above-described advantages. Even when an abnormality occurs at one of the multi-phase motor drive currents in multiplex systems, the multi-phase motor drive current can be supplied to the multi-phase electric motor, and the steering assistance function of the electric power steering device continues.

In addition, a vehicle includes the motor controller with the above-described advantages. It is therefore possible to provide a vehicle, in which the multiphase motor drive current is supplied to the electric motor, so that the electric motor continuously generates torque to improve the reliability of the electric motor, even when an abnormality occurs at at least one of the motor drive circuits in multiplex systems of the multi-phase electric motor.

DESCRIPTION OF EMBODIMENTS

Hereinafter, embodiments of the present invention will be described with reference to the accompanied drawings.

Figure 1:
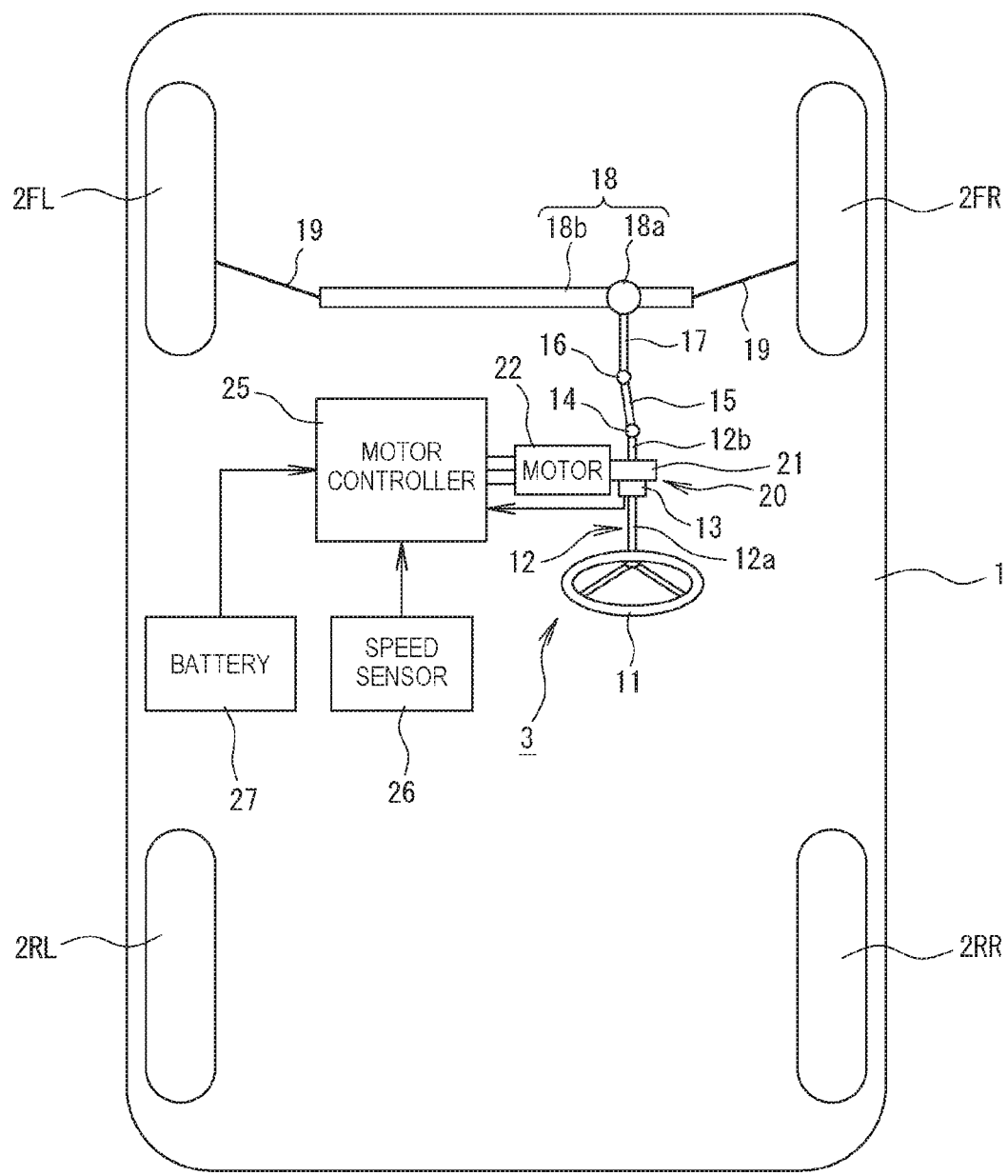
FIG. 1 is a system configuration view of a vehicle in which an electric power steering device including a motor controller according to the present invention is mounted.

As illustrated in FIG. 1, a vehicle 1 in the present invention includes front wheels 2FR and 2FL, which are turning wheels, and rear wheels 2RR and 2RL. The font wheels 2FR and 2FL are turned by an electric power steering device 3.

The electric power steering device 3 includes a steering wheel 11, and a steering force operated on the steering-wheel 11 by a driver is transmitted to a steering shaft 12. The steering shaft 12 includes an input shaft 12a and an output shaft 12b. One end of the input shaft 12a is coupled with the steering wheel 11, and the other end of the input shaft 12a is coupled through a steering torque sensor 13 with one end of the output shaft 12b.

Then, the steering force that has been transmitted to the output shaft 12b is transmitted to a lower shaft 15 through a universal joint 14. Further, the steering force is transmitted through a universal joint 16 to a pinion shaft 17. The steering force that has been transmitted to the pinion shaft 17 is transmitted to a tie rod 19 through a steering gear 18, and turns the front wheels 2FR and 2FL operating as the turning wheels. Here, the steering gear 18 is configured in a rack and pinion type, including a pinion 18a coupled with the pinion shaft 17, and a rack 18b engaging the pinion 18a. Then, the rotational movement that has been transmitted to the pinion 18a is converted by the rack 18b into linear movement in a vehicle width direction.

The output shaft 12b of the steering shaft 12 is coupled with a steering assistance mechanism 20 that transmits a steering assistance force to the output shaft 12b. The steering assistance mechanism 20 includes a reduction gear 21 configured with, for example, a worm gear mechanism coupled with the output shaft 12b, and a three-phase electric motor 22, which is coupled with the reduction gear 21, and which operates as a multi-phase electric motor made of, for example, a three-phase brushless motor configured to generate the steering assistance force.

The steering torque sensor 13 is configured to detect the steering torque that has been exerted to the steering wheel 11 and transmitted to the input shaft 12a. The steering torque sensor 13 is configured to convert, for example, the steering torque into a twisting angle displacement of a torsion bar, not illustrated, inserted between the input shaft 12a and the output shaft 12b, to convert the twisting angle displacement into a resistance change or magnetic change, and to detect the change.

Figure 2:
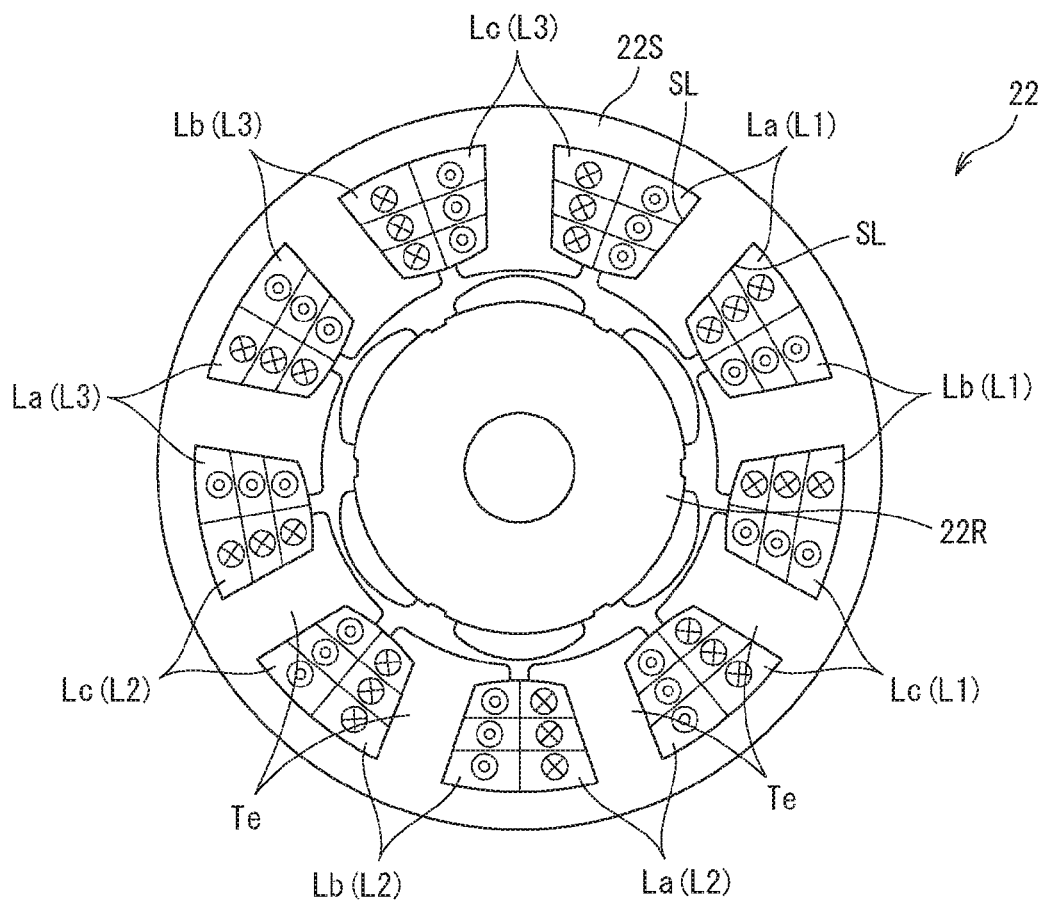
FIG. 2 is a cross-sectional view of a configuration of a three-phase electric motor in a first embodiment.

In addition, as illustrated in FIG. 2, the three-phase electric motor 22 has a Surface Permanent Magnet (SPM) motor configuration including a stator 22S including, for example, nine teeth Te that are magnetic poles protruding inwardly on an inner circumferential surface to form slots SL, and a rotor 22R of, for example, six-pole SPM arranged rotatably and facing the teeth Te on the inner circumferential side of the stator 22S.

Figure 3:
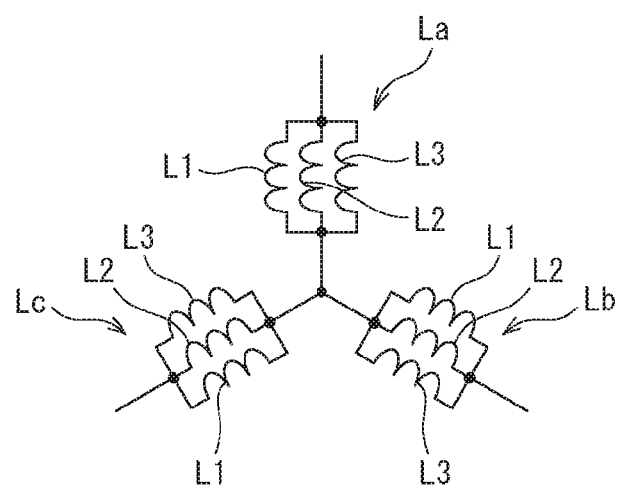
FIG. 3 is a schematic view of a winding configuration of the three-phase electric motor of FIG. 2.

In addition, motor windings La, Lb, and Lc of three phases including A phase, B phase, and C phase are wound around the slots SL of the stator 22S. As illustrated in FIG. 3, each of the motor windings La, Lb, and Lc has a configuration in which, for example, three coil portions L1, L2, and L3 are connected in parallel to each other, and the coil portions L1 to L3 are respectively wound around the slots SL in three layers. In the motor windings La, Lb, and Lc, one ends are connected with each other to form a star connection, and the other ends are connected to a motor controller 25, so that A-phase motor drive current Ia, B-phase motor drive current Ib, and C-phase motor drive current Ic are respectively supplied.

Figure 4:
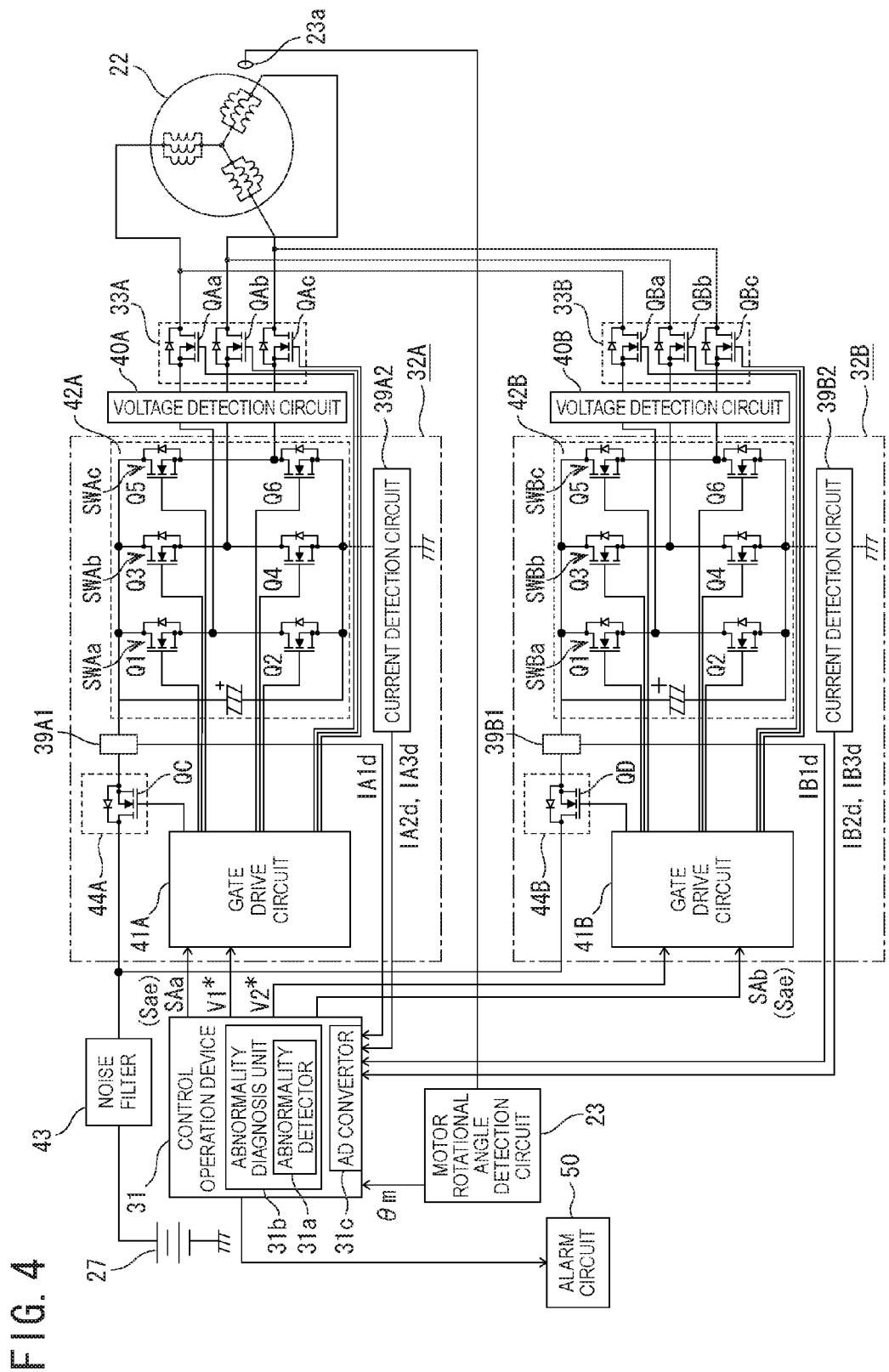
FIG. 4 is a circuit diagram of a specific configuration of a motor controller in the first embodiment.

Further, the three-phase electric motor 22 includes a rotational position sensor 23a such as a resolver for detecting the rotational position of the motor, as illustrated in FIG. 4. A detection value of the rotational position sensor 23a is supplied to a motor rotational angle detection circuit 23, and the motor rotational angle detection circuit 23 detects a motor rotational angle θm.

Steering torque Ts detected by the steering torque sensor 13 and a vehicle speed Vs detected by the vehicle speed sensor 26 are input into the motor controller 25, and a motor rotational angle θm output from the motor rotational angle detection circuit 23 is also input into the motor controller 25.

Also, a direct current power is input from a battery 27, which operates as a direct current voltage source, to the motor controller 25.

The specific configuration of the motor controller 25 is illustrated in FIG. 4. Specifically, the motor controller 25 includes a control operation device 31 configured to operate a motor current instruction value, and a main motor drive circuit 32A and a backup motor drive circuit 32B, into which three-phase voltage instruction values V1* and V2* output from the control operation device 31 are input individually. Further, the motor controller 25 includes a main motor current cutoff unit 33A to be mainly used, and a backup motor current cutoff unit 33B for backup, which are interposed between output sides of the main motor drive circuit 32A and the backup motor drive circuit 32B and the motor windings La to Lc of the three-phase electric motor 22.

The main motor drive circuit 32A and the backup motor drive circuit 32B respectively include a gate drive circuit 41A and a gate drive circuit 41B configured to receive a three-phase voltage instruction value V1* and a three-phase voltage instruction value V2*, which are output from the control operation device 31, and to form gate signals. In addition, the main motor drive circuit 32A and the backup motor drive circuit 32B respectively include a main inverter circuit 42A and a backup inverter circuit 42B, into which the gate signals output from the gate drive circuits 41A and 41B.

In receipt of the voltage instruction value V1* input from the control operation device 31, the gate drive circuit 41A forms six gate signals subjected to the pulse width modulation (PWM) based on the voltage instruction value V1* and a carrier signal Sc of a triangular wave, and outputs these gate signals to the main inverter circuit 42A. In receipt of the voltage instruction value V1*, the gate drive circuit 41A supplies a gate signal for turning a field effect transistor QC of a power supply cutoff unit 44A into on state. In receipt of the voltage instruction value V1*, the gate drive circuit 41A supplies gate signals for turning field effect transistors QAa to QAc of the main motor current cutoff unit 33A into on state.

In receipt of an abnormality detection signal SAa from an abnormality detector 31a, the gate drive circuit 41A stops supplying the gate signals to field effect transistors Qk and Qk+1 included in an abnormal switching arm SWAj. Together with this, the gate drive circuit 41A supplies a gate signal for turning a field effect transistor QAj, which corresponds to the abnormal switching arm SWAj, of the main motor current cutoff unit 33A into off state.

On the other hand, in receipt of the voltage instruction value V2* input from the control operation device 31, a gate drive circuit 41B of a backup motor drive circuit 32B forms six gate signals subjected to the pulse width modulation (PWM) based on the voltage instruction value V2* and the carrier signal Sc of a triangular wave, and outputs these gate signals to the backup inverter circuit 42B. In receipt of the voltage instruction value V2*, the gate drive circuit 41B supplies a gate signal for turning a field effect transistor QD of the power supply cutoff unit 44B into on state, to the field effect transistor QD. In receipt of the voltage instruction value V2*, the gate drive circuit 41B respectively supplies gate signals for turning field effect transistors QBa to QBc of a backup motor current cutoff unit 33B into on state, to the field effect transistors QBa to QBc.

In receipt of an abnormality detection signal SAb input from the abnormality detector 31a, the gate drive circuit 41B starts supplying gate signals respectively to the field effect transistors Qk and Qk+1 included in a switching arm SWBj of the same phase corresponding to the abnormal switching arm SWAj. Together with this, the gate drive circuit 41B supplies a gate signal for turning the field effect transistor QAj, which corresponds to the switching arm SWBj, of the main motor current cutoff unit 33A into on state.

It is to be noted that the control operation device 31 may generate six PWM gate signals commonly to be input into the main inverter circuit 42A and the backup inverter circuit 42B.

Battery current of a battery 27 is input through a noise filter 43, the power supply cutoff units 44A and 44B, and current detection circuits 39A1 and 39B1 into the main inverter circuit 42A and the backup inverter circuit 42B. Electrolytic capacitors CA and CB for smoothing are respectively connected to the input side of the main inverter circuit 42A and the backup inverter circuit 42B.

Each of the main inverter circuit 42A and the backup inverter circuit 42B includes six field effect transistors (FETs) Q1 to Q6, which operate as six switching elements, and which are configured such that three switching arms SWAa, SWAb, and SWAc, and SWBa, SWBb, and SWBc are connected in parallel, in each of which two field effect transistors are connected in series.

In the main inverter circuit 42A and the backup inverter circuit 42B, the gate signals output from the gate drive circuits 41A and 41B are respectively input into gates of the field effect transistors Q1 to Q6. Thus, from connection points between the field effect transistors of the respective switching arms SWAa, SWAb, and SWAc, and SWBa, SWBb, and SWBc an A-phase motor drive current Ia, a B-phase motor drive current Ib, and a C-phase motor drive current Ic are supplied through the main motor current cutoff units 33A and 33B to the motor windings La, Lb, and Lc of the three-phase electric motor 22.

In each of the switching arms SWAa, SWAb, and SWAc, and SWBa, SWBb, and SWBc of the main inverter circuits 42A and 42B, sources of the field effect transistors Q2, Q4, and Q6, which are lower arms, are connected with each other, and are respectively grounded through current detection circuits 39A2 and 391B2, each of which includes a shunt resistance. Hence, motor currents I1a to I1c and I2a to I2c are detected by the current detection circuits 39A and 39B.

Figure 7A:
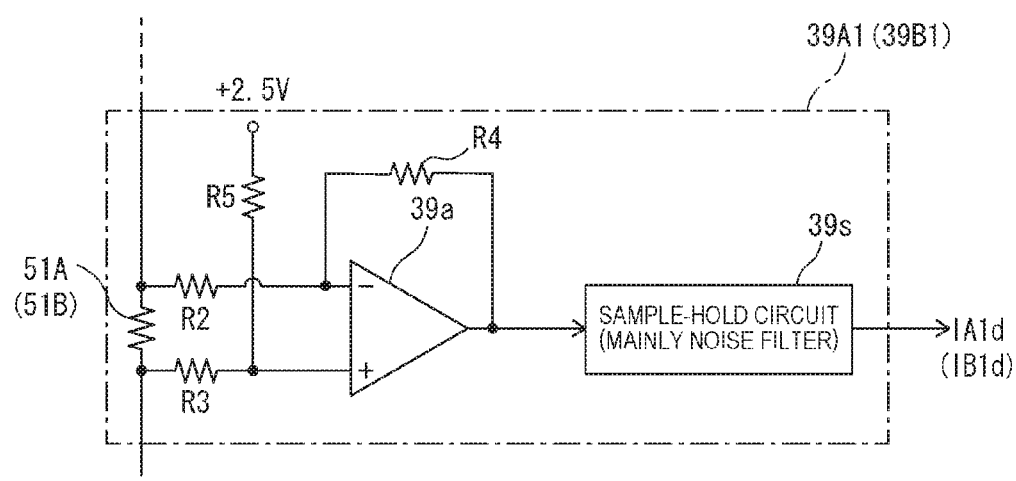
FIG. 7A and FIG. 7B are block diagrams of a specific configuration of a current detection circuit of FIG. 4.
Figure 7B:
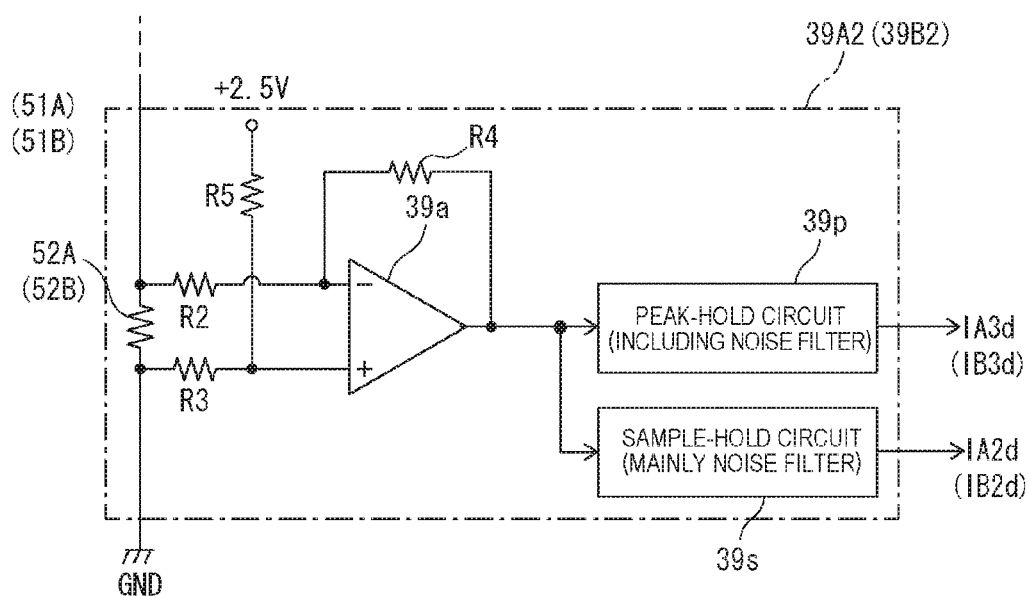

Each of the current detection circuits 39A1, 39A2, 39B1, and 39B2 is configured as illustrated in FIG. 7A and FIG. 7B. In other words, as illustrated in FIG. 4 and FIG. 7A, the current detection circuits 39A1 and 39B1 respectively include shunt resistances 51A and 51B for current detection, which are arranged between the power supply side of each of the switching arms SWAa to SWAc and SWBa to SWBc and the power supply cutoff units 44A and 44B. As illustrated in FIG. 7A, the current detection circuits 39A1 and 39B1 respectively include operational amplifiers 39a, into which both end voltages of the shunt resistance 51A and 51B are input through resistances R2 and R3, and sample-hold circuits 39s made of mainly noise filters to which output signals from the operational amplifiers 39a are supplied.

Then, upper current detection values IA1d and IB1d output from the sample-hold circuit 39s are supplied to an AD converter 31c of the control operation device 31.

Also, as illustrated in FIG. 4 and FIG. 7B, current detection circuit 39A2 and 39B2 respectively include shunt resistances 52A and 52B for current detection, which are arranged between the ground side of each of the switching arms SWAa to SWAc and SWBa to SWBc and the ground. As illustrated in FIG. 7B, the current detection circuits 39A2 and 39B2 respectively include operational amplifiers 39a, into which both end voltages of the shunt resistance 52A and 52B are input through resistances R2 and R3, peak-hold circuits 39p including noise filters into which output signals from the operational amplifiers 39a are supplied, and sample-hold circuits 39s made of mainly noise filters to which output signals from the operational amplifiers 39a are supplied.

Then, lower current detection values IA2d and IB2d of respective phases output from the sample-hold circuits 39s and peak values IA3d and IB3d output from the peak-hold circuits 39p are supplied to the AD convertor 31c of the control operation device 31. The control operation device 31 calculates current detection values Iad, Ibd, and Icd of the respective phases based on the lower current detection values IA2d and IB2d, the peak values IA3d and IB3d, and the voltage instruction values V1* and V2* for setting duty ratios of the pulse width modulation signals of the gate drive circuit 41A and 41B.

The main motor current cutoff unit 33A includes three field effect transistors QAa, QAb, and QAc for cutting off the currents. The source of the field effect transistor QAa is connected through the motor voltage detection circuit 40A to a connection point of the field effect transistors Q1 and Q2 of the switching arm SWAa of the main inverter circuit 42A, and the drain thereof is connected to the A-phase motor winding La of the three-phase 22.

The source of the field effect transistor QAb is connected through the motor voltage detection circuit 40A to a connection point of the field effect transistors Q3 and Q4 of the switching arm SWAb of the main inverter circuit 42A, and the drain thereof is connected to the B-phase motor winding Lb.

The source of the field effect transistor QAc is connected through the motor voltage detection circuit 40A to a connection point of the field effect transistors Q5 and Q6 of the switching arm SWAc of the main inverter circuit 42A, and the drain thereof is connected to the C-phase motor winding Lc.

The backup motor current cutoff unit 33B includes three field effect transistors QBa, QBb, and QBc for cutting off the currents. Here, the source of the field effect transistor QBa is connected through the motor voltage detection circuit 40B to a connection point of the field effect transistors Q1 and Q2 of the switching arm SWBa of the backup inverter circuit 42B, and the drain thereof is connected to the A-phase motor winding La.

The source of the field effect transistor QBb is connected through the motor voltage detection circuit 40B to a connection point of the field effect transistors Q3 and Q4 of the switching arm SWBb of the backup inverter circuit 42B, and the drain thereof is connected to the B-phase motor winding Lb.

The source of the field effect transistor QBc is connected through the motor voltage detection circuit 40B to a connection point of the field effect transistors Q5 and Q6 of the switching arm SWBc of the backup inverter circuit 42B, and the drain thereof is connected to the C-phase motor winding Lc.

In the field effect transistors QAa to QAc and QBa to QBc of the main motor current cutoff unit 33B and the backup motor current cutoff unit 33A, anodes of parasitic diodes D are connected in an identical direction on the main inverter circuit 42A side and on the backup inverter circuit 42B side.

Each of the power supply cutoff units 44A and 44B is configured with a parallel circuit including a field effect transistor (FET) QC or QD and a parasitic diode. In addition, the drains of the field effect transistors QC and QD are connected to the battery 27 through the noise filter 43, and the sources thereof are respectively connected to the main inverter circuit 42A and the backup inverter circuit 42B.

Figure 5:
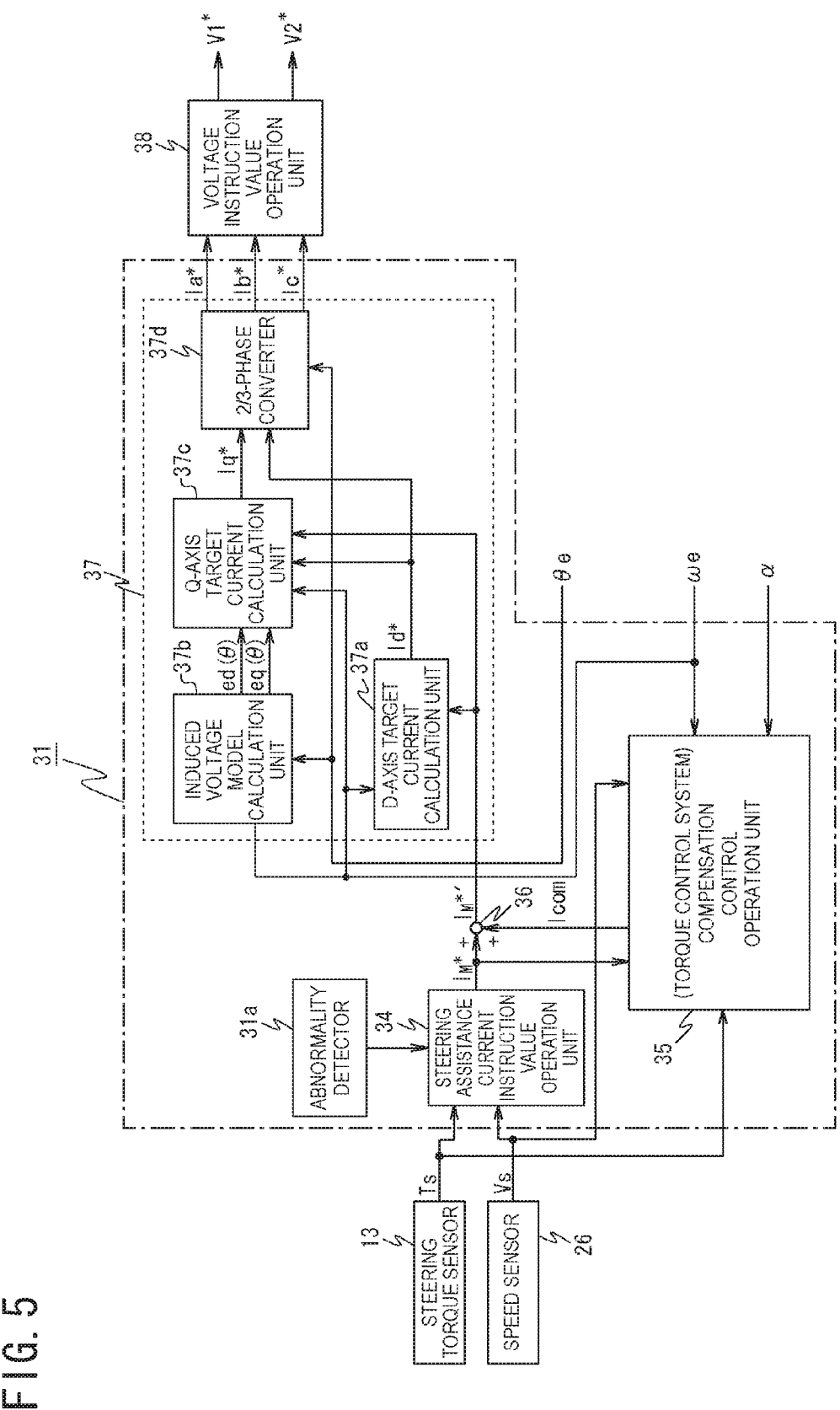
FIG. 5 is a block diagram of a specific configuration of the motor controller of FIG. 4.

The control operation device 31 is not illustrated in FIG. 5, but the steering torque Ts detected by the steering torque sensor 13 and the vehicle speed Vs detected by the speed sensor 26, which are illustrated in FIG. 1, are input into the control operation device 31. In addition, as illustrated in FIG. 4, the motor rotational angle θm output from the motor rotational angle detection circuit 23 is input into the control operation device 31.

As illustrated in FIG. 5, the control operation device 31 includes a steering assistance current instruction value operation unit 34 configured to calculate a steering assistance current instruction value I*, and a compensation control operation unit 35 configured to compensate the steering assistance current instruction value I* calculated by the steering assistance current instruction value operation unit 34 based on a motor angular velocity ωe and a motor angular acceleration α that have been input. The control operation device 31 further includes a d-q axis current instruction value operation unit 37 configured to calculate a d-q axis current instruction value based on the compensated steering assistance current instruction value I*' operated by the compensation control operation unit 35, and to convert the d-q axis current instruction value into a three-phase electric current instruction value.

Figure 6:
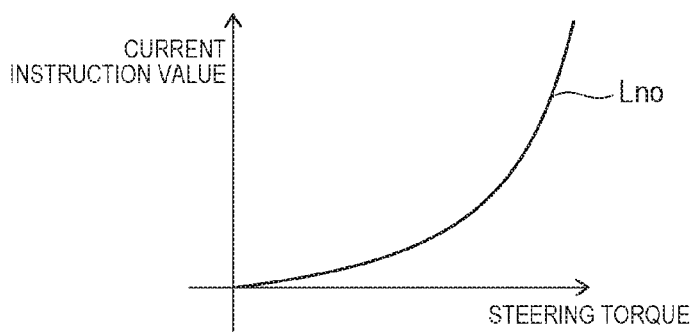
FIG. 6 is a characteristic diagram of an example of a relationship between steering torque and a steering assistance current instruction value.

The steering assistance current instruction value operation unit 34 is configured to calculate a steering assistance current instruction value I*, which is made of a current instruction value, based on the steering torque Ts and the vehicle speed Vs, by referring to a steering assistance current instruction value calculation map illustrated in FIG. 6. The steering assistance current instruction value calculation map, as illustrated in FIG. 6, is a characteristic diagram indicated by a parabola-shaped curve where the horizontal axis indicates the steering torque Ts, and the vertical axis indicates the steering assistance current instruction value I*.

In the normal operation of the main motor drive circuit 32A and the backup motor drive circuit 32B, the steering assistance current instruction value I* is calculated based on the steering torque Ts and the vehicle speed Vs, by referring to a predefined normal current instruction value calculation curve Lno, as indicated by a solid line in FIG. 6.

The compensation control operation unit 35 is configured to calculate, for example, a convergence compensation value for compensating the convergence of the yaw rate based on the motor angular velocity ωe, and a torque compensation value for preventing a degradation in the inertia feel or control responsiveness to compensate the torque corresponding amount generated by inertia of the three-phase electric motor 22 based on and the motor angular acceleration α. Further, the compensation control operation unit 35 is configured to estimate Self-Aligning Torque (SAT), to calculate a self-aligning torque compensation value for compensation, and to sum the convergence compensation value, the torque compensation value, and the self-aligning torque compensation value to calculate an instruction value compensation value Icom.

Then, the compensation control operation unit 35 is configured to cause an adder 36 to add the calculated instruction value compensation value Icom to the steering assistance current instruction value I* output from the steering assistance current instruction value operation unit 34, to calculate the compensated steering assistance current instruction value I*', and to output the compensated steering assistance current instruction value I*' to a d-q axis current instruction value operation unit 37.

The d-q axis current instruction value operation unit 37 includes a d-axis target current calculation unit 37a, an induced voltage model calculation unit 37*b*, a q-axis target current calculation unit 37*c*, and a ⅔-phase converter 37*d*.

The d-axis target current calculation unit 37*a* is configured to calculate a d-axis target current Id* based on the compensated steering assistance current instruction value I*' and the motor angular velocity ωe.

The induced voltage model calculation unit 37*b* is configured to calculate a d-axis Electro Magnetic Force (EMF) component ed (θ) and a q-axis EMF component eq (θ) of a d-q axis induced voltage model EMF based on the motor rotational angle θ and the motor angular velocity ωe. The q-axis target current calculation unit 37*c* is configured to calculate a q-axis target current Iq* based on the d-axis EMF component ed (θ) and the q-axis EMF component eq (θ) output from the induced voltage model calculation unit 37*b*, the d-axis target current Id* output from the d-axis target current calculation unit 37*a*, the compensated steering assistance current instruction value I*', and the motor angular velocity ωe.

The ⅔-phase converter 37*d* is configured to convert the d-axis target current Id* output from the d-axis target current calculation unit 37*a* and the q-axis target current Iq* output from the q-axis target current calculation unit 37*c* into three-phase electric current instruction values Ia*, Ib*, and Ic*.

The control operation device 31 further includes a voltage instruction value operation unit 38 configured to calculate voltage instruction values V1* and V2* to be respectively output to the main motor drive circuits 32A and 32B, based on the A-phase current instruction value Ia*, the B-phase current instruction value Ib*, and the C-phase current instruction value Ic*, which have been calculated. The voltage instruction value operation unit 38 is configured to subtract the current detection values Iad, Ibd, and Icd calculated based on the lower current detection values IA2*d* and IB2*d* detected by the current detection circuits 39A2 and 39B2, from the A-phase current instruction value Ia*, the B-phase current instruction value Ib*, and the C-phase current instruction value Ic*. The current deviations ΔIa, ΔIb, and ΔIc are calculated accordingly. Also, the voltage instruction value operation unit 38 is configured to perform, for example, a PI control operation or a PID control operation on the calculated current deviations ΔIa, ΔIb, and ΔIc. The voltage instruction value operation unit 38 calculates the three-phase voltage instruction values V1* and V2* to be output to the main motor drive circuit 32A and the backup motor drive circuit 32B. Then, the voltage instruction value operation unit 38 respectively outputs the calculated three-phase voltage instruction values V1* and V2* to the main motor drive circuit 32A and the backup motor drive circuit 32B. Here, the three-phase voltage instruction values V1* and V2* are output as identical values to each other.

As illustrated in FIG. 4, the control operation device 31 receives each of the motor phase voltages V1*ma*, V1*mb*, and V1*mc*, and V2*ma*, V2*mb*, and V2*mc*, which have been detected respectively by the motor voltage detection circuits 40A and 40B. The motor voltage detection circuits 40A and 40B are respectively arranged between the main motor drive circuit 32A and the main motor current cutoff unit 33A, and between the backup motor drive circuit 32B and the backup motor current cutoff unit 33B.

As illustrated in FIG. 4, the control operation device 31 receives the upper current detection values IA1*d* and IB1*d*, which are respectively output from the current detection circuits 39A1 and 39B1. The current detection circuits 39A1 and 39B1 are respectively configured to detect the direct currents to be supplied to the main inverter circuit 42A and the backup inverter circuit 42B. Furthermore, the control operation device 31 receives the lower current detection values IA2*d* and IB2*d*, which are respectively output from the current detection circuits 39A2 and 39B2. The current detection circuits 39A2 and 39B2 are respectively configured to detect the direct currents flowing from the main inverter circuit 42A and the backup inverter circuit 42B to the ground, as motor currents.

Then, in the control operation device 31, each of the motor phase voltages Vm1*a*, Vm1*b*, and Vm1*c*, and Vm2*a*, Vm2*b*, and Vm2*c*, the upper current detection values IA1*d* and IB1*d*, and the lower current detection values IA2*d* and IB2*d* are input into the AD convertor 31*c*. The control operation device 31 includes an abnormality diagnosis unit 31*b*, which includes an abnormality detector 31*a* configured to detect an open failure of the upper arm, a short-circuit failure of the lower arm, and the like of the field effect transistors (FETs) Q1 to Q6, which operate as switching elements included in the main inverter circuit 42A and the backup inverter circuit 42B.

The abnormality detector 31*a* is configured to detect an abnormality as follows.

When a short-circuit failure occurs at any one of the field effect transistors Q2, Q4, or Q6 of the lower arm in the main inverter circuit 42A, for example, the motor drive current Ii to be output to the main motor current cutoff unit 33A does not flow from the switching arm SWAi (i=a, b, or c) where the short-circuit failure occurs. Thus, a phase detection voltage Vi, which is detected by the motor voltage detection circuit 40A, drops to near the ground potential, and this situation can be determined to be an abnormality caused by the short-circuit failure.

Similarly, when an open failure occurs at any one of the field effect transistors Q1, Q3, or Q5 of the upper arm in the main inverter circuit 42A, the abnormality can be detected similarly.

When a short-circuit failure occurs at any one of the field effect transistors Q1, Q3, or Q5 of the upper arm in the main inverter circuit 42A, a high voltage is kept at the corresponding voltage detection circuit V1*mi*. From such a detected voltage, the short-circuit failure of the upper arm can be determined.

When an open failure or a short-circuit failure of a field effect transistor (FET) included in the main inverter circuit 42A is detected, the abnormality detector 31*a* outputs to the gate drive circuit 41A the abnormality detection signals SAa for stopping the supply of the gate signals to the gates of the field effect transistor (FET) Qk (k=1, 3, or 5) and Qk+1 having the same phase with the phase of the switching arm SWAj (j=a, b, or c) where the abnormality is occurring. Together with this, the abnormality detector 31*a* outputs an off signal to the corresponding field effect transistor QAk configured to cut off the current to the main motor current cutoff unit 33A.

The abnormality detector 31*a* outputs the abnormality detection signal SAb to the gate drive circuit 41B of the backup motor drive circuit 32B. Then, the gate drive circuit 41B supplies gate signals same with the gate signals supplied to the field effect transistors Qk and Qk+1 of the switching arm SWAj where the abnormality is occurring, to the switching arm SWBj in the backup motor drive circuit 32B in the same phase with the phase of the switching arm SWAj in the main motor drive circuit 32A, to which the current is cut off. The gate drive circuit 41B also supplies the gate signal for turning the field effect transistor QBj into on state to the field effect transistor QBj corresponding to the switching arm SWBj of the backup motor current cutoff unit 33B.

It is to be noted that as to the detection signals detected by the current detection circuits 39A2 and 39B2, the Pulse Width Modulation (PWM) signals are input into the gates of the field effect transistors (FETs) of the main inverter circuit 42A and the backup inverter circuit 42B. The A-phase to C-phase motor drive currents Ia to Ic, which are output from the main inverter circuit 42A and the backup inverter circuit 42B are rectangular wave signals where the duty ratios are controlled, accordingly. For this reason, when instantaneous values of the A-phase to C-phase motor drive currents Ia to Ic are simply detected and the rectangular wave signals are off, a normal motor current value will not be indicated.

Hence, in order to detect the lower current detection values IA2d and IB2d correctly, as illustrated in FIG. 7B, an output from the operational amplifier 39a, in which both end voltages of the shunt resistances 51A and 51B are amplified, is supplied to the peak-hold circuit 39p, which maintains a peak value for at least a period of almost one cycle of the pulse width modulation signal. By maintaining the peak value in this way, peak (maximum) values IA3d and IB3d of respective phases of the lower current detection values IA2d and IB2d can be detected quickly and correctly.

In a normal state of the main inverter circuit 42A, the abnormality detector 31a switches the rotational drive state of the three-phase electric motor 22 driven by the main motor drive circuit 32A to the rotational drive state of the three-phase electric motor 22 driven by the backup motor drive circuit 32B, whenever a predefined period has passed after the control starts, and performs an abnormality diagnosis of the backup inverter circuit 421B of the backup motor drive circuit 32B.

In this case, while outputting the voltage instruction value V1* to the main motor drive circuit 32A, the control operation device 31 outputs the voltage instruction value V2*, which is the same value with the voltage instruction value V1*, to the gate drive circuit 41B of the backup motor drive circuit 32B. The gate drive circuit 41B forms the gate signal to be output to each of the field effect transistors Q1 to Q6 of the backup inverter circuit 42B based on the voltage instruction value V2*, supplies the formed gate signal to the gate of each of the field effect transistors Q1 to Q6, and supplies the gate signal for turning into on state to the field effect transistor QD of the power supply cutoff unit 44B. In this state, the gate drive circuit 41B of the backup motor drive circuit 32B supplies the gate signal for turning into on state to each of the field effect transistors QBa to QBc of the backup motor current cutoff unit 33B at a timing identical to the timing when the gate drive circuit 41A of the main motor drive circuit 32A supplies the gate signal for turning into off state to each of the field effect transistors QAa to QAc of the main motor current cutoff unit 33A.

The driving of the three-phase electric motor 22 is switched to the backup motor drive circuit 32B from the main motor drive circuit 32A instantly, and in this state, the abnormality detector 31a detects a short-circuit abnormality and an open abnormality of each of the switching arms SWBa to SWBc of the backup inverter circuit 42B in a similar manner to the abnormality detection of the main inverter circuit 42A. When the abnormality detector 31a detects a short-circuit failure or an open failure of the backup inverter circuit 42B, the abnormality detector 31a outputs alarm information for promoting repair of the backup inverter circuit 42B to an alarm circuit 50.

When the abnormality detection of the backup inverter circuit 42B ends, the abnormality detector 31a outputs an abnormality detection end signal Sae to each of the gate drive circuits 41A and 41B of the main motor drive circuit 32A and the backup motor drive circuit 32B. In this way, the gate drive circuit 41B supplies the gate signal for turning into off state to each of the field effect transistors QBa to QBc of the backup motor current cutoff unit 33B, and at the same time, the gate drive circuit 41A supplies the gate signal for turning into on state to each of the field effect transistors QAa to QAc of the main motor current cutoff unit 33A. In this manner, driving of the three-phase electric motor 22 is returned to the main motor drive circuit 32A from the backup motor drive circuit 32B.

It is to be noted that when the abnormality detection end signal Sae is input, the gate drive circuit 41B of the backup motor drive circuit 32B turns each of the field effect transistors QBa to QBc of the backup motor current cutoff unit 33B into off state, stops supplying the gate signal to each of the field effect transistors Q1 to Q6 of the backup inverter circuit 42B, supplies the gate signal for turning into off state to the power supply cutoff unit 44B, and stops driving of the backup motor drive circuit 32B.

The operation of the embodiments will be described below.

When the ignition switch, not illustrated, is in off state, and the vehicle is in stop state, and the steering assistance control process is also in operation stop state, the control operation device 31 of the motor controller 25 is in non-operating state. For this reason, the steering assistance control process and the abnormality monitoring process to be carried out by the control operation device 31 are stopped. Thus, the three-phase electric motor 22 stops the operation, and the output of the steering assistance force to the steering assistance mechanism 10 is stopped.

When the ignition switch is turned into on state from this operation stop state, the control operation device 31 turns into operating state and starts the steering assistance control process and the abnormality monitoring process. In this situation, there is no open failure or short-circuit failure occurring at each of the field effect transistors Q1 to Q6 in the main inverter circuit 42A and the backup inverter circuit 42B of the main motor drive circuit 32A and the backup motor drive circuit 32B. Each of the field effect transistors Q1 to Q6 are operating normally. In non-steering state where the steering wheel 11 is not being operated, the steering torque Ts is "0" in the steering assistance control process to be carried out by the control operation device 31, and the vehicle speed Vs is also "0". The steering assistance current instruction value I* is calculated by referring to the normal current instruction value calculation curve Lno as indicated by the solid line in the current instruction value calculation map of FIG. 6.

Then, the d-axis current instruction value Id* and the q-axis current instruction value Iq* are calculated, based on the steering assistance current instruction value I*, which has been calculated, and the motor electrical angle θe, which is input from the motor rotational angle detection circuit 23, and the d-axis current instruction value Id* and the q-axis current instruction value Iq*, which have been calculated, are subjected to dq ⅔ phase conversion process, and the A-phase current instruction value Ia*, the B-phase current instruct on value Ib*, and the C-phase current instruction value Ic* are calculated.

The current deviations ΔIa, ΔIb, and ΔIc are respectively calculated between the phase current instruction values Ia*, Ib*, and Ic* and the phase current detection values Iad, Ibd and Ibc, which are calculated from the phase current detection values IAad, IAbd, and IAcd, which have been detected by the current detection circuit 39A2. The current deviations ΔIa, ΔIb, and ΔIc, which have been calculated, are subjected to the PI control process or the PID control process to calculate the target voltage instruction values Va*, Vb*, and Vc*.

Then, the target voltage instruction values Va*, Vb*, and Vc*, which have been calculated, are output to the gate drive circuit 41A of the main motor drive circuit 32A, as the voltage instruction value V1*. As the main inverter circuit 42A is normally operating, the control operation device 31 outputs the abnormality detection signals SAa and SAb of the logical value "0" to the gate drive circuits 41A and 41B.

The gate drive circuit 41A outputs three gate signals of high level to the main motor current cutoff unit 33A, accordingly. Thus, the field effect transistors QAa to QAc of the main motor current cutoff unit 33A are turned into on state, and the main inverter circuit 42A and the motor windings L1 and L2 of the three-phase electric motor 22 become electrically conductive. Then, the three-phase electric motor 22 is electrically controllable.

At the same time, the gate signal of high level is output from the gate drive circuit 41A to the power supply cutoff unit 44A. Then, the field effect transistor QC of the power supply cutoff unit 44A is in on state, and the direct current power from the battery 27 through the noise filter 43 is supplied to the main inverter circuit 42A.

Further, the gate drive circuit 41A forms the gate signal by carrying out the pulse width modulation process based on the voltage instruction value V1*, which is input from the control operation device 31. The gate signals that have been formed are supplied to the gates of the field effect transistors Q1 to Q6 of the main inverter circuit 42A.

Thus, when the vehicle is in stop state and the steering wheel 11 is not being operated, the steering torque Ts is "0". Hence, the steering assistance current instruction value I* is also "0", all of the A-phase to C-phase motor drive currents Ia to Ic, which are output from the main inverter circuit 42A, become "0", and the three-phase electric motor 22 maintains the stop state.

However, the steering wheel 11 is operated in the vehicle stop state or in the vehicle travel start state, that is so-called stationary steering is performed, and then the steering torque Ts becomes large. Therefore, by referring to FIG. 6, the steering assistance current instruction value I*, which is large, is calculated. The voltage instruction value V1*, which corresponds to such a large value, is supplied to the gate drive circuit 41A of the main motor drive circuit 32A. For this reason, the gate signal having a duty ratio corresponding to such a large voltage instruction value V1* is output from the gate drive circuit 41A to the main inverter circuit 42A.

Figure 8:
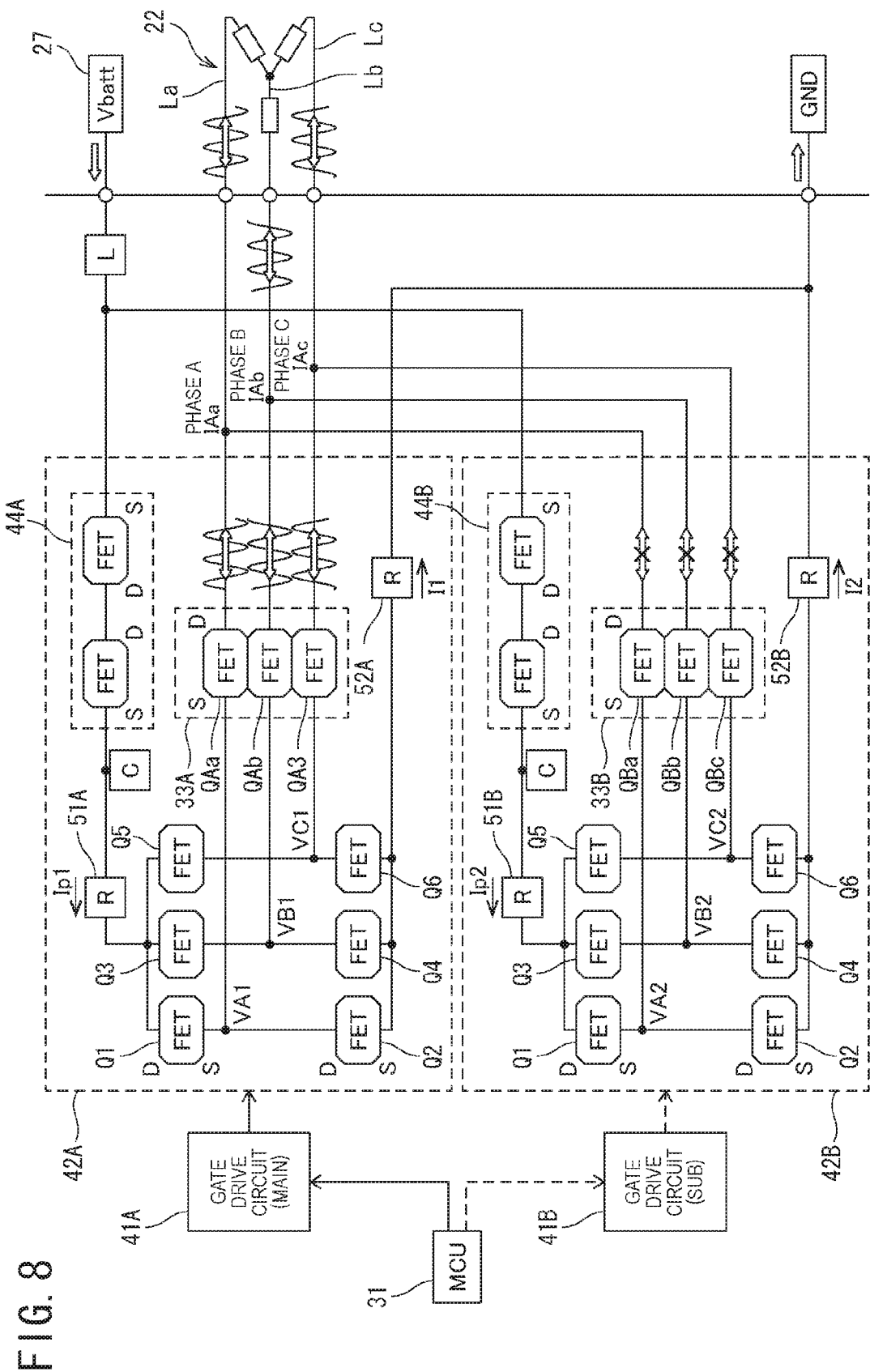
FIG. 8 is a block diagram of a normal drive state.

As illustrated in FIG. 8, the A-phase motor drive current IAa, the B-phase motor drive current IAb, and the C-phase motor drive current IAc, which are made of pulse width modulation signals depending on the steering assistance current instruction value I*, and which have a phase difference of 120 degrees, are output from the main inverter circuit 12A. Then, the above-described currents flow across the field effect transistors QAa to QAc corresponding to the respective phases of the main motor current cutoff unit 33A, and are supplied to the motor windings La to Lc of the three-phase electric motor 22. It is to be noted that "A" is applied to the reference numeral of the current to distinguish the motor drive current output from the main inverter circuit 42A from the motor drive current output from the backup inverter circuit 42B. Also, "B" is applied to the reference numeral of the motor drive current output from the backup inverter circuit 42B.

Then, the three-phase electric motor 22 is rotationally driven, and a large steering assistance force corresponding to the target steering assistance current instruction value I*, which depends on the steering torque Ts, is generated, and the steering assistance force is transmitted through the reduction gear 21 to the output shaft 12b. This configuration allows the operation of the steering wheel 11 in a light steering force.

Then, when the vehicle speed Vs increases, the steering assistance current instruction value I*, which is calculated depending on the vehicle speed, becomes smaller than the value at the stationary steering. The three-phase electric motor 22 generates the steering assistance force that is reduced appropriately in accordance with the steering torque Ts and the vehicle speed Vs.

Thus, in the state where the main inverter circuit 42A is in normal state, the abnormality detector 31a carries out the abnormality detection process on the main inverter circuit 42A. However, the gate signal is not supplied to the backup inverter circuit 42B, and each of the field effect transistors QBa to QBc of the backup motor current cutoff unit 33B and the field effect transistor QD of the power supply cutoff unit 44B are controlled to be in off state. The abnormality diagnosis cannot be carried out in the above-described drive stop state. Hence, when an abnormality occurs at the main inverter circuit 42A and the process is switched to the backup inverter circuit 42B, there is no guarantee that the steering assistance control is continuously carried out.

In the present embodiment, however, the abnormality diagnosis unit 31b carries out the abnormality detection process of the backup inverter circuit 42B at a predetermined time interval, after the steering assistance control starts.

The abnormality detection process starts by outputting the voltage instruction value V2*, which has an identical value to the voltage instruction value V1*, which is output to the gate drive circuit 41A of the main motor drive circuit 32A, to the gate drive circuit 41B of the backup motor drive circuit 32B.

The gate drive circuit 41B of the backup motor drive circuit 32B receives the voltage instruction value V2*, and forms the gate signal to be output to each of the field effect transistors Q1 to Q6 of the backup inverter circuit 42B based on the voltage instruction value V2*, in a similar manner to the gate drive circuit 41A of the main motor drive circuit 32A, as described above. Then, the gate drive circuit 41B outputs the formed gate signal to each of the field effect transistors Q1 to Q6, and supplies the gate signal for turning into on state to the field effect transistor QD of the power supply cutoff unit 44B.

The gate signal for turning into on state is supplied to each of the field effect transistors QBa to QBc of the backup motor current cutoff unit 33B, and in addition, a cutoff signal Sch is output to the gate drive circuit 41A of the main motor drive circuit 32A.

Then, each of the field effect transistors QBa to QBc of the backup motor current cutoff unit 33B is controlled to be in on state, and substantially at the same time, each of the field effect transistors QAa to QAc of the main motor current cutoff unit 33A is controlled to be in off state.

Figure 9:
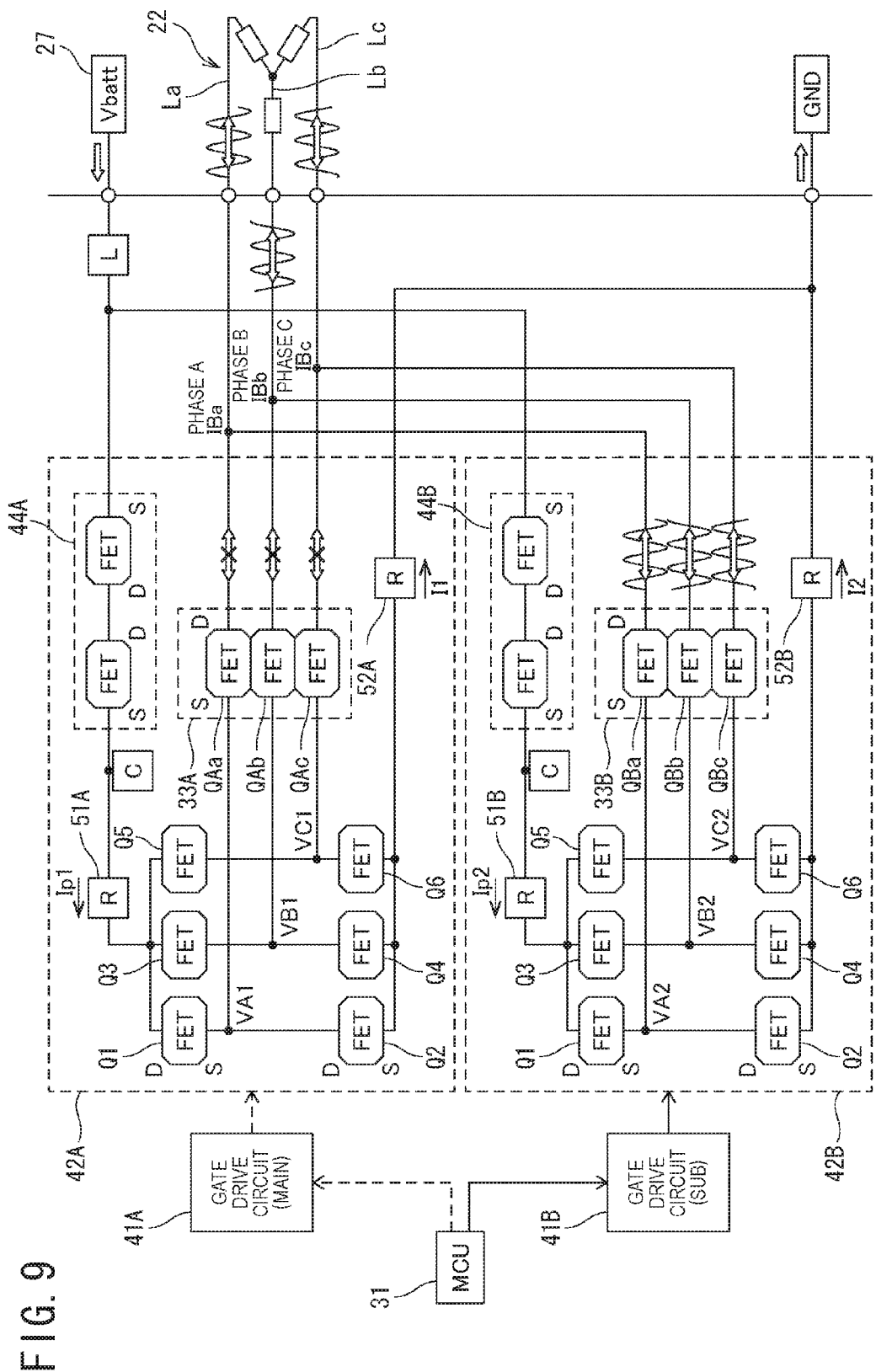
FIG. 9 is a block diagram of a diagnosis drive state.

Each of the field effect transistors Q1 to Q6 of the backup inverter circuit 42B of the backup motor drive circuit 32B is driven by the gate signal made of a pulse width modulation signal. Hence, as illustrated in FIG. 9, each of the phase motor drive currents IBa to IBc, which are output from the backup inverter circuit 42B, allows the abnormality diagnosis state where the rotation of the three-phase electric motor 22 is continuously driven.

In the abnormality diagnosis state, each of the field effect transistors Q1 to Q6 of the backup inverter circuit 42B is controlled to be on or off. Therefore, in a similar manner to the main inverter circuit 42A of the main motor drive circuit 32A, as described above, the abnormality detector 31a is capable of detecting a short-circuit abnormality and an open abnormality of each of the switching arms SWBa to SWBc.

When the switching arms SWBa to SWBc are normal, the abnormality detection end signal Sae is input into each of the gate drive circuits 41A and 41. Accordingly, each of the field effect transistors QBa to QBc of the backup motor current cutoff unit 33B is controlled to be in off state, and almost at the same time, each of the field effect transistors QAa to QAc of the main motor current cutoff unit 33A returns to be on state.

For this reason, the three-phase electric motor 22 returns to normal drove state by the main motor drive circuit 32A from the drive state by the backup motor drive circuit 32B.

In the abnormality diagnosis state, it is assumed that a short-circuit abnormality or an open abnormality is detected at any one of the switching arm SKBa to SWBc of the backup inverter circuit 42B of the backup motor drive circuit 32B. In this case, the abnormality detector 31a outputs the abnormality information that there is an abnormality at the backup system to the alarm circuit 50, and in addition, stores an abnormality type and an abnormality occurring point in a non-volatile memory, for example, connected to the control operation device 31.

Therefore, by inspecting the vehicle in a service station and the like, the abnormality type and the abnormality occurring point can be recognized immediately from the abnormality information stored in the non-volatile memory.

From the normal state, when a short-circuit failure occurs at one or more of the field effect transistors Q2, Q4, and Q6 of the lower arm in the main inverter circuit 42A of the main motor drive circuit 32A, for example, the motor drive current Ij does not flow from the switching arm SWBj (j=a, b, or c), where the short-circuit failure occurs to the main motor current cutoff unit 33A. Hence, the voltage detection value detected by the motor voltage detection circuit 40A is not a predetermined voltage, and an abnormality can be detected.

When a short-circuit failure occurs at the main inverter circuit 42A of the main motor drive circuit 32A, the abnormality detection signal SAa, which indicates the switching arm SWAj where an abnormality occurs, is supplied to the gate drive circuit 41A of the main motor drive circuit 32A.

Figure 10:
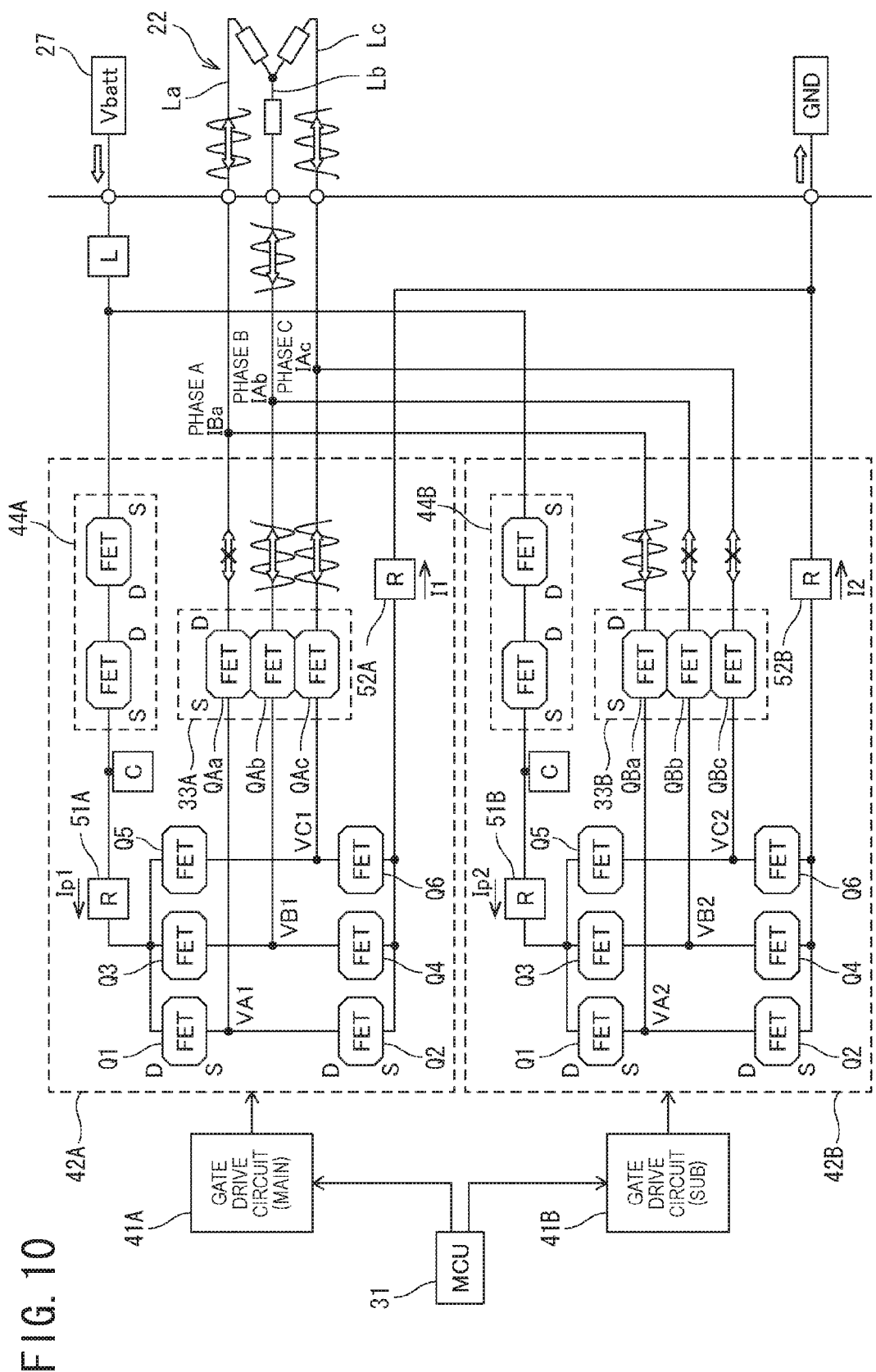
FIG. 10 is a block diagram of an abnormal drive state.

The gate drive circuit 41A stops supplying the gate signals to the field effect transistors Q1 and Q2 of the switching arm SWAa, as illustrated in FIG. 10, when the abnormality occurs at the switching arm SWAa, for example. Together with this, the gate drive circuits 41A supplies the gate signal for turning off the field effect transistor QAa to the corresponding field effect transistor QAa of the main motor current cutoff unit 33A.

Accordingly, the A-phase motor drive current IAa, which is output from the switching arm SWAa of the main inverter circuit 42A, is cut off. At the same time, the abnormality detection signal SAb, which indicates to drive the switching arm SWBa having the same phase with the phase of the switching arm SWAa, where an abnormality occurs, of the main inverter circuit 42A, and the voltage instruction value V2* are output from the control operation device 31 to the gate drive circuit 41B of the backup motor drive circuit 32B.

Accordingly, as illustrated in FIG. 10, the gate signals same to the gate signal has been supplied to the field effect transistors Q1 and Q2 in the switching arm SWAa of the main inverter circuit 42A of the main motor drive circuit 32A until then, are supplied to the field effect transistors Q1 and Q2 of the switching arm SUBa, which correspond to the A-phase of the backup inverter circuit 42B. At the same time, the field effect transistor QD of the power supply cutoff unit 44B is controlled to be in on state, and the field effect transistor QBa of the backup motor current cutoff unit 33B is controlled to be in on state. The A-phase motor drive current IBa, which is formed by the switching arm SWBa, is supplied to the A-phase motor winding La of the three-phase electric motor 22.

Thus, an A-phase drive signal is supplied to the three-phase electric motor 22 from the switching arm SWBa of the backup inverter circuit 42B of the backup motor drive circuit 32B. A B-phase drive signal and a C-phase drive signal are respectively supplied from the switching arms SWab and SWAc of the main inverter circuit 42A of the main motor drive circuit 32A, in a similar manner to the normal operation.

Therefore, the driving of the three-phase electric motor 22 is controllable in a completely same manner with the case where the main inverter circuit 42A is normal.

It is assumed that an abnormality occurs at either one of the switching arm SWAb or SWAc of the main inverter circuit 42A, or an abnormality occurs at any two or three of the switching arms SWAa to SWAc. Also in this case, the backup motor drive circuit 32B is capable of driving the switching arm corresponding to the switching arm where an abnormality occurs to supply each of the phase drive signals to the three-phase electric motor 22.

Here, when even a single abnormality occurs at either one of the components in the main inverter circuit 42A, all the components including the field effect transistors QC and QAa to QAc may be turned to off, so that the backup inverter circuit 42B may be driven.

It is to be noted that also when an abnormality occurs at the main inverter circuit 42A, the alarm circuit 50 gives an alarm to promote a user to visit a service station, and in addition, the abnormality type and the abnormality occurring point are stored in the non-volatile memory connected with the control operation device 31. This configuration facilitates repair works in the service station easily.

In this manner, when an abnormality occurs at one or more of the switching arms SWAa to SWAc in the main inverter circuit 42A, the connection between the switching arm SWAj, where the abnormality occurs, and the J-phase coil of the three-phase electric motor 22 is cut off by the field effect transistor QAj of the main motor current cutoff unit 33A. This configuration certainly prevents the three-phase electric motor 22 from operating as a generator to generate the electromagnetic braking. As a result, when a short-circuit abnormality or an open abnormality occurs at the main inverter circuit 42A, the three-phase electric motor 22 is continuously driven in a good condition without activating the braking torque.

In the above-described embodiments, not only the abnormality of the switching arms SWAa to SWAc of the main inverter circuit 42A but also the abnormality of the switching arms SWBa to SWbc of the backup inverter circuit 42B are diagnosed. This configuration certainly prevents the situation where the backup inverter circuit 42B cannot be an alternative.

In addition, the same motor drive signal with the signal supplied from the normal main motor drive circuit 32A can be also supplied from the backup motor drive circuit 32B, so that the steering assistance control can continue in the same manner with the normal operation. In this situation, an alarm can be given to the driver to promote a user to visit a service station.

In the above-described embodiments, the descriptions have been given to the case where when an abnormality detection in the backup inverter circuit 42B is performed, each phase drive signal of the three-phase electric motor 22 is switched from the main motor drive circuit 32A to the backup motor drive circuit 32B.

However, the present invention is not limited to the above-described configuration. When the abnormality detection process is carried out for the backup inverter circuit 42B of the backup motor drive circuit 32B, as illustrated in FIG. 10, as described above, the same phase of the main inverter circuit 42A and the backup inverter circuit 42B, may be sequentially switched by each phase, for example, from the A-phase switching arms SWAa and SWBa, so that the abnormality detection process may be carried out for each of the switching arms SWBa to SWBc, instead of switching all the three phases simultaneously.

In this case, since there is one switching arm in the main inverter circuit 42A and there is one switching arm in the backup inverter circuit 42B, which correspond to one of the phases in the three-phase electric motor 22, the influence caused by a delay or phase deviation at the time of switching the current can be reduced.

In the above-described embodiments, the descriptions have been given of the case where the current detection circuits 39A and 39B detect the motor currents by using the two shunt resistances 51A, 52A and 51B, 52B for the respective inverter circuits. However, the present invention is not limited to this. In other words, in the present invention, the shunt resistance may be arranged individually on the ground side of each of the phase switching arms SWAa to SWAc and SWBa to SWBc of the main motor drive circuits 32A and 32B, to detect the motor current of each phase or one of the three shunt resistances may be omitted and the motor current of the omitted phase may be calculated in an operation.

In the above-described embodiments, the descriptions have been given of the case where the AD convertor 31$c$ is included in the control operation device 31. However, the present invention is not limited to this. The AD convertor may be arranged on output sides of the current detection circuits 39A1, 39A2 and 39B1, 39B2.

In the above-described embodiments, the descriptions have been given of the case where the electric motor is the three-phase electric motor. However, the present invention is not limited to this. An electric motor of four or more phases is applicable to the present invention.

In the above-described embodiments, the descriptions have been given of the case where the motor controller in the present invention is applied to the electric power steering device. However, the present invention is not limited to this. The present invention is applicable to an arbitrary system using an electric motor, such as an electric brake system, a steer by wire system, or a motor drive device for vehicle travelling.

Heretofore, the entire disclosure of Japanese Patent Application No. 2014-38424 filed on Feb. 28, 2014 where priority of the present invention is claimed is incorporated herein by reference in its entirety.

Although a limited number of embodiments of the present invention have been illustrated and described, it would be appreciated by those skilled in the art that the scope is not limited to them and changes may be made in these embodiments based on the above disclosure.

REFERENCE SIGNS LIST

1 . . . vehicle, 3 . . . electric power steering device, 11 . . . steering wheel, 12 . . . steering shaft, 13 . . . steering torque sensor, 13$a$ . . . torsion bar, 13$b$ . . . input side rotational angle sensor, 13$c$ . . . output side rotational angle sensor, 18 . . . steering gear, 20 . . . steering assistance mechanism, 22 . . . three-phase electric motor, La . . . A-phase motor winding, Lb . . . B-phase motor winding, Lc . . . C-phase motor winding, L1 to L3 . . . coil portion, 25 . . . motor controller, 26 . . . speed sensor, 27 . . . battery, 31 . . . control operation device, 32A . . . main motor drive circuit, 32B . . . backup motor drive circuit, 33A, 33B . . . motor current cutoff unit, 34 . . . steering assistance current instruction value operation unit, 35 . . . compensation control operation unit, 36 . . . adder, 37 . . . d-q axis current instruction value operation unit, 38 . . . voltage instruction value operation unit, 39A1, 39A2, 39B1, 39B2 . . . current detection circuit, 40A, 40B . . . voltage detection circuit, 41A, 41B . . . gate drive circuit, 42A . . . main inverter circuit, 42B . . . backup inverter circuit, 44A, 44B . . . power supply cutoff unit, 50 . . . alarm circuit

The invention claimed is:

1. A motor controller comprising:
a main motor drive circuit configured to control driving of a multi-phase electric motor;
a backup motor drive circuit connected to the multi-phase electric motor in parallel to the main motor drive circuit, and configured to control driving of the multi-phase electric motor, when an abnormality occurs at the main motor drive circuit; and
an abnormality diagnosis unit configured to diagnose the abnormality of the main motor drive circuit and the backup motor drive circuit;
wherein in a normal drive state, only the main motor drive circuit is configured to drive the multi-phase electric motor,
wherein in a backup drive state, when the abnormality diagnosis unit diagnoses that the abnormality occurs at the main motor drive circuit as a diagnoses result, a motor current of a phase output unit where the abnormality occurs is cut off and the phase output unit that has been cut off is replaced with another phase output unit of a same phase in the backup motor drive circuit to drive the multi-phase electric motor,
wherein the abnormality diagnosis unit is configured to diagnose the abnormality of the main motor drive circuit, in the normal drive state where the main motor drive circuit is driving the multi-phase electric motor, and
wherein while the main motor drive circuit is driving the multi-phase electric motor, the abnormality diagnosis unit is configured to diagnose the abnormality of the backup motor drive circuit, by replacing at least a part of the phase output unit in the main motor drive circuit with the another phase output unit of the same phase in the backup motor drive circuit.

2. The motor controller according to claim 1, further comprising:

a main motor current cut off unit arranged between a multi-phase output side of the main motor drive circuit and the multi-phase electric motor; and a backup current cut off unit arranged between a multi-phase output side of the backup motor drive circuit and the multi-phase electric motor.

3. The motor controller according to claim 1, wherein while the main motor drive circuit is driving the multi-phase electric motor, the abnormality diagnosis unit is configured to diagnose the abnormality of the backup motor drive circuit, by replacing between all of phase outputs from the main motor drive circuit with all of phase outputs of the same phase from the backup motor drive circuit.

4. The motor controller according to claim 1, wherein while the main motor drive circuit is driving the multi-phase electric motor, the abnormality diagnosis unit is configured to diagnose the abnormality of the backup motor drive circuit, by replacing a phase output from the main motor drive circuit with a phase output of the same phase from the backup motor drive circuit, by each phase.

5. An electric power steering device comprising the motor controller according to claim 1, the motor controller comprising an electric motor configured to generate a steering assistance force at a steering mechanism.

6. A vehicle comprising the motor controller according to claim 1.

* * * * *